No. 706,419. Patented Aug. 5, 1902.
B. G. JAYNE.
CROZE CUTTING MACHINE.
(Application filed Oct. 8, 1901.)
(No Model.) 2 Sheets—Sheet 1.

WITNESSES:
Frank D. Ober
Frank H. Harriman

INVENTOR,
Beniah Gaston Jayne,
BY
J. C. Clayton,
ATTORNEY

No. 706,419. Patented Aug. 5, 1902.
B. G. JAYNE.
CROZE CUTTING MACHINE.
(Application filed Oct. 8, 1901.)
(No Model.) 2 Sheets—Sheet 2.

WITNESSES: INVENTOR,
BY
ATTORNEY

UNITED STATES PATENT OFFICE.

BENAIAH GUSTIN JAYNE, OF NEW YORK, N. Y., ASSIGNOR TO HORACE CRAIGHEAD, OF FLUSHING, BOROUGH OF QUEENS, NEW YORK.

CROZE-CUTTING MACHINE.

SPECIFICATION forming part of Letters Patent No. 706,419, dated August 5, 1902.

Application filed October 8, 1901. Serial No. 77,935. (No model.)

*To all whom it may concern:*

Be it known that I, BENAIAH GUSTIN JAYNE, a citizen of the United States, and a resident of New York city, in the county of New York and State of New York, have invented certain new and useful Improvements in Croze-Cutting Machines, of which the following is a specification.

This invention is in the class of barrel-making machinery; and it particularly consists of a new construction for the purpose of crozing, chamfering, and trimming the staves of barrels, each stave being acted upon separately and the staves being of unifom length and approximately of uniform width.

Reference is had to the accompanying drawings, in which—

Figure 2:
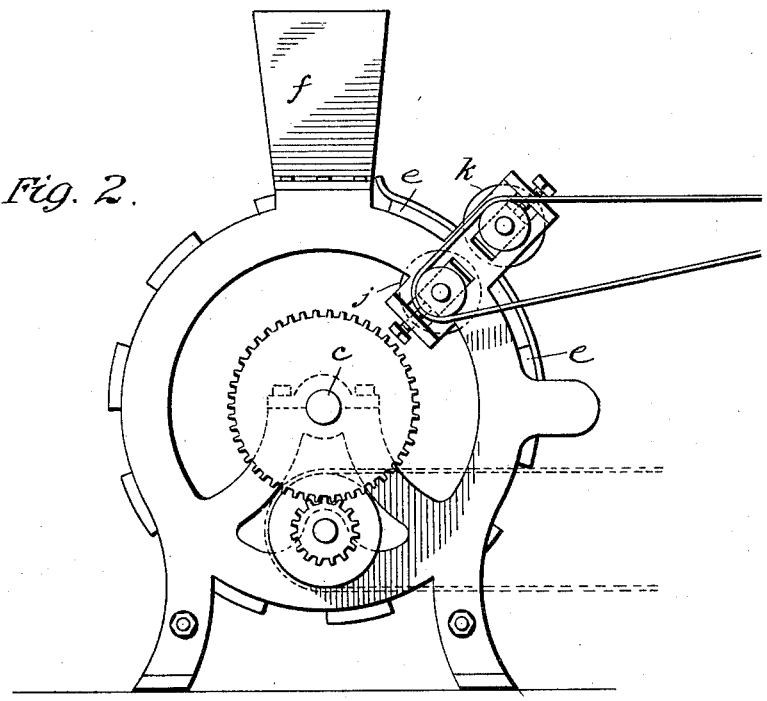
Figure 1:
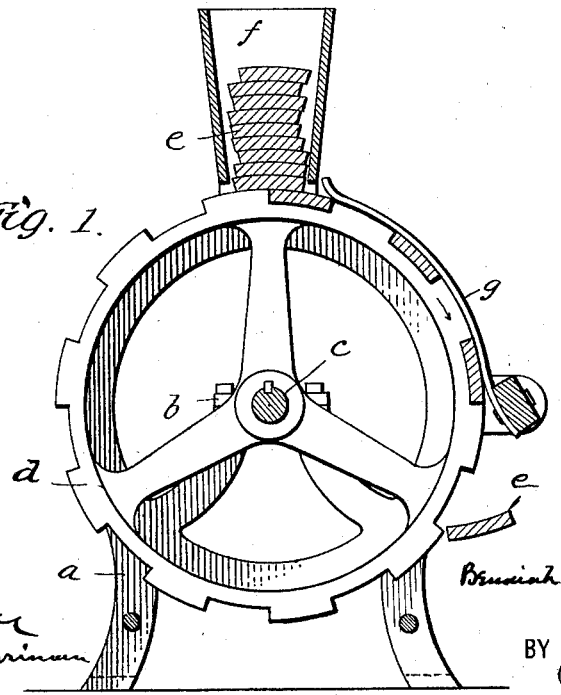
Figure 3:
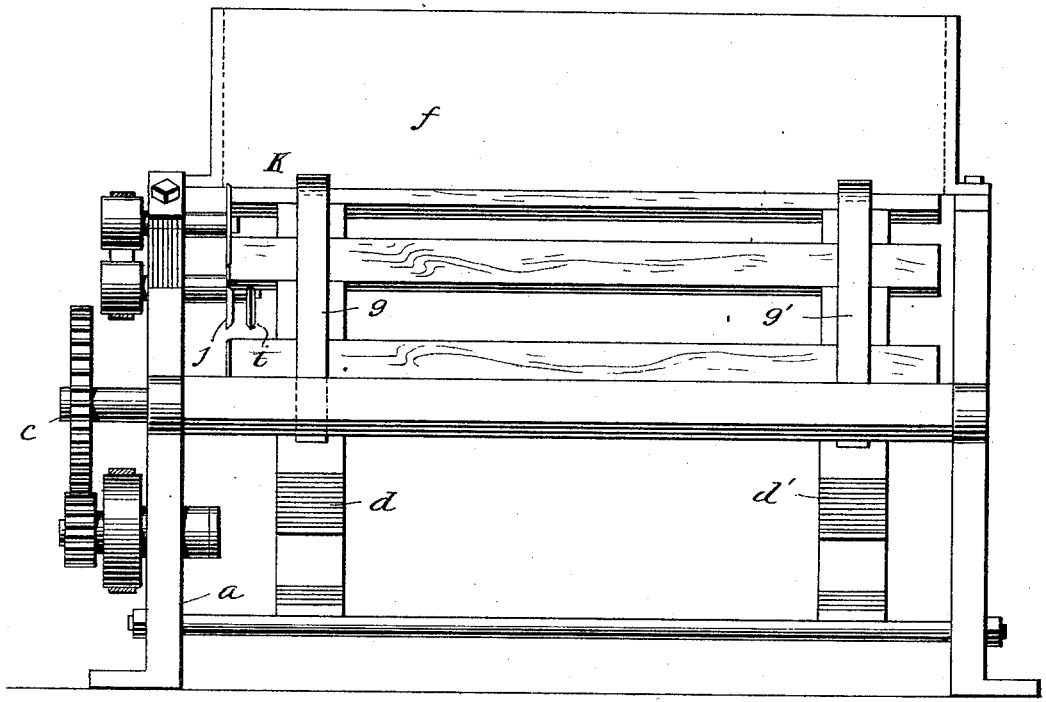
Figure 4:
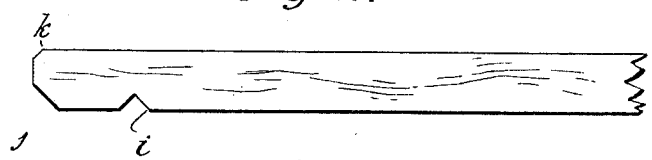
Figure 5:
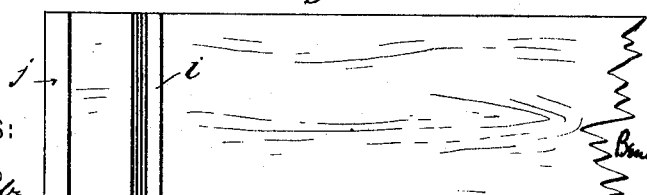

Figure 1 is an end view in section of my machine with the cutting-heads removed. Fig. 2 is an end view in which the crozing and the chamfering knives and the operative mechanism are shown. Fig. 3 is a side elevation. Figs. 4 and 5 show one end of a stave after it has been finished in the machine.

$a$ is the end frame of the machine; $b$, the supports of the shaft $c$, which carries two sprockets $d$ and $d$, which take the staves $e$ one by one from the hopper $f$, the machine turning to the right, as represented in Fig. 1. Each projection on the sprocket carries a stave from the hopper and under the spring $g$, which holds them firmly to the face of the sprocket $d$ while the work is being done.

The croze-cutting head $i$ and the chamfering-head $j$ are placed, as clearly shown in Fig. 2, at a suitable distance from the hopper $f$ in the direction of rotation of the sprocket-carrier and the trimmer-head K directly above it. The trimmer-head is located on the same line radial to the stave-carrier as is the croze-cutter, so that the spring-pressure of the trimming-cutter exerts a force to keep the work up to the croze and chamfering cutters and oppose the tendency of the latter to throw the work out of the carrier.

The cutter-heads $i$ $j$ K may be of any of the well-known forms of saws or inserted knives and are adjustable to the work by screws, as shown in Fig. 2.

The object of this invention is to make a croze cutting, chamfering, and trimming machine automatic and continuous in action and as a unit in a series of my inventions for manufacturing barrels by machinery.

The staves (which have been cut or split, planed, and formed either in other machines of mine or otherwise) are dropped directly into the hopper $f$ and are carried therefrom by the sprocket-carrier $d$ $d$ under springs $g$ $g$ to the three cutter-heads $i$, $j$, and K, which produce the work, as shown in Fig. 4. The staves continue their course until they leave the machine, as shown at $l$ in Fig. 1.

Having described my invention, what I claim is—

1. In a stave-crozing machine, the combination with a suitable frame, and a main driving-shaft journaled therein, of two rotatable stave-carriers, each provided with corresponding peripheral seats to receive the staves, spring-pressed guides for normally holding the stave-blanks in said seats, a crozing-cutter and a chamfering-cutter mounted on the same shaft, adjustable bearings for said shaft, a trimming-cutter mounted on an independent shaft on the same line radial to the stave-carrier as to the croze-cutter, adjustable bearings for said shaft, means for revolving the cutters, and a feed hopper or magazine centrally located above the supporting-frame.

2. In a stave-crozing machine, the combination with a suitable frame, a stave magazine or hopper located centrally above said frame, and a main driving-shaft journaled therein, of two rotatable stave-carriers mounted on said shaft, each provided with corresponding peripheral seats to receive the staves, spring-pressed guides for normally holding the stave-blanks in said seats, a crozing-cutter and a chamfering-cutter mounted on a single shaft, adjustable bearings for said shaft, a trimming-cutter mounted on an independent shaft on the same line radial to the stave-carrier as to the croze-cutter, adjustable bearings for said shaft, means for adjusting the cutters carried on the single shaft and the cutter mounted on the independent shaft toward and from each other, mechanism for revolving the cutters, and mechanism for driving the main shaft.

Signed at New York city, in the county of New York and State of New York, this 17th day of April, A. D. 1901.

BENAIAH GUSTIN JAYNE.

Witnesses:
FRANK R. MEETEER,
FRANK H. HARRIMAN.